April 5, 1960

J. T. PICKERING 2,931,596

HELICOPTER PLANE

Filed April 27, 1954

James T. Pickering
INVENTOR

BY *Clthow+Co.*
ATTORNEYS.

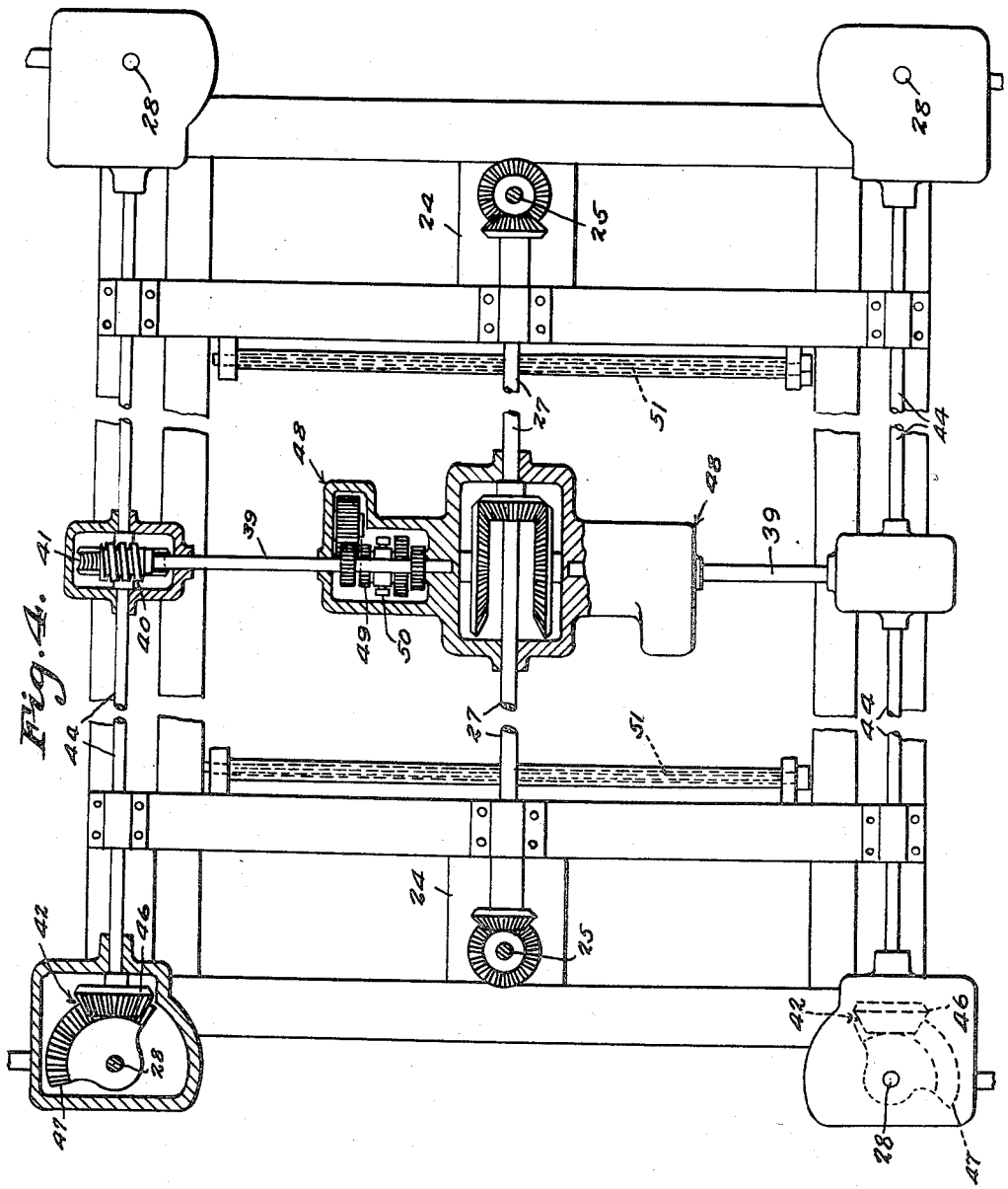

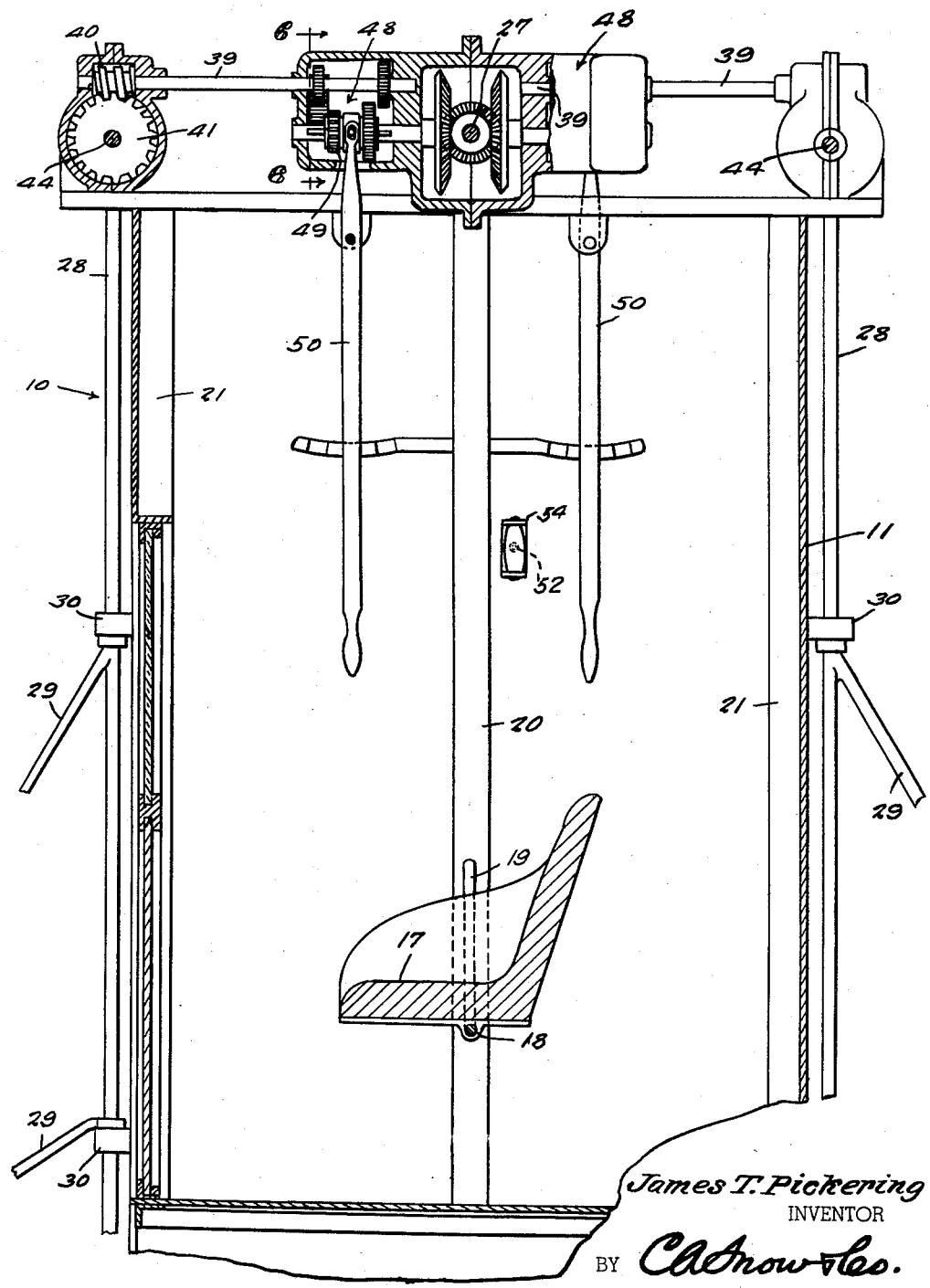

2,931,596
HELICOPTER PLANE
James T. Pickering, Charlottesville, Va.

Application April 27, 1954, Serial No. 425,955

9 Claims. (Cl. 244—7)

This invention relates to a helicopter and more particularly to an airborne device for rising and descending vertically, and for sustained horizontal flight.

It is an object of this invention to provide a helicopter of the kind to be more particularly described hereinafer which is movable in a horizontal flight path by moving the center of gravity of the plane to thereby tilt the plane and propeller relative to the horizon. This movement in flight is accomplished by the propellers, which serve as well to sustain the helicopter in the air and move it vertically.

It is another object of this invention to provide a helicopter of this kind whose operation and altitude are always under the control of a pilot seated on a seat which is supported from a horizontally disposed pivot in the fuselage of the plane.

It is another object of this invention to provide a helicopter of this kind having landing wheels which are extensible laterally and retractable by the operator to thereby shift the center of gravity of the plane in the air with the result of tilting the positions of the propellers to accomplish sustained horizontal flight.

It is yet a further object of this invention to provide a helicopter plane of this kind which may be readily piloted by a person without the common type of flight training.

Other and further objects and advantages of the invention will be hereinafter described and the novel features thereof defined in the appended claims.

In the drawings:

Fig. 4 is a plan view, partly broken away and partly in section, of the wheel retracting means of my helicopter.

Fig. 5 is a side elevation, partly broken away and partly in section, of the fuselage and power controls of the helicopter plane.

The helicopter of my invention is particularly adapted for vertical flight before and after a horizontal flight in the air.

Figure 1:
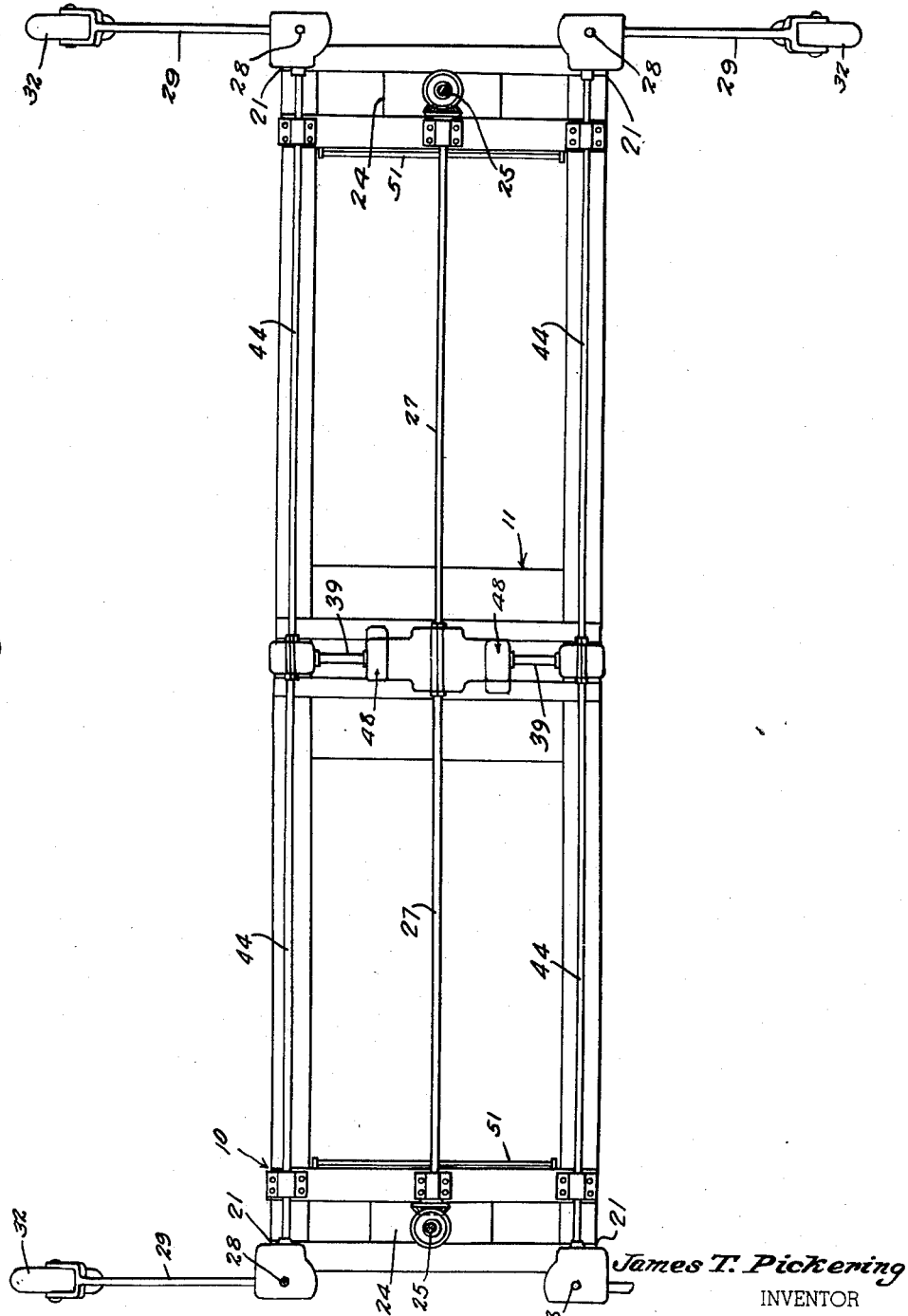
Fig. 1 is a plan view, partly broken away and partly in section, of a helicopter constructed according to my invention, the propeller and wings not shown.

The helicopter 10 initially for vertical flight, of my invention includes a fuselage pod 11 having an upper wing panel 12 and a lower wing panel 14 normally both substantially rectangular in shape and extending laterally a substantial distance from opposite sides of the fuselage in substantially vertical planes, the lower panel being substantially identical in shape and size to the upper, and being indicated by dotted lines in Figure 1, initially for vertical flight of the helicopter 10.

Both of the upper and lower wing panels 12 and 14 include ailerons 15 adjacent the outer ends thereof, spaced from the fuselage and the ailerons of both the upper and lower panels are connected together under the control of the pilot by means of foot pedals 35 connected to the ailerons through cable 56 which are passed about pulleys 56a and 56b before being connected to the ailerons, to be more fully described hereinafter by a tie rod 16 in much of a conventional manner.

A regular type of seat 17 is pivotally mounted within the fuselage 11 by a U-shaped support 18 which is pivoted at its upper ends 19 of a frame bar 20 carried within the fuselage pod. This construction and arrangement of the fuselage and seat keeps the pilot in upright position.

Figure 2:
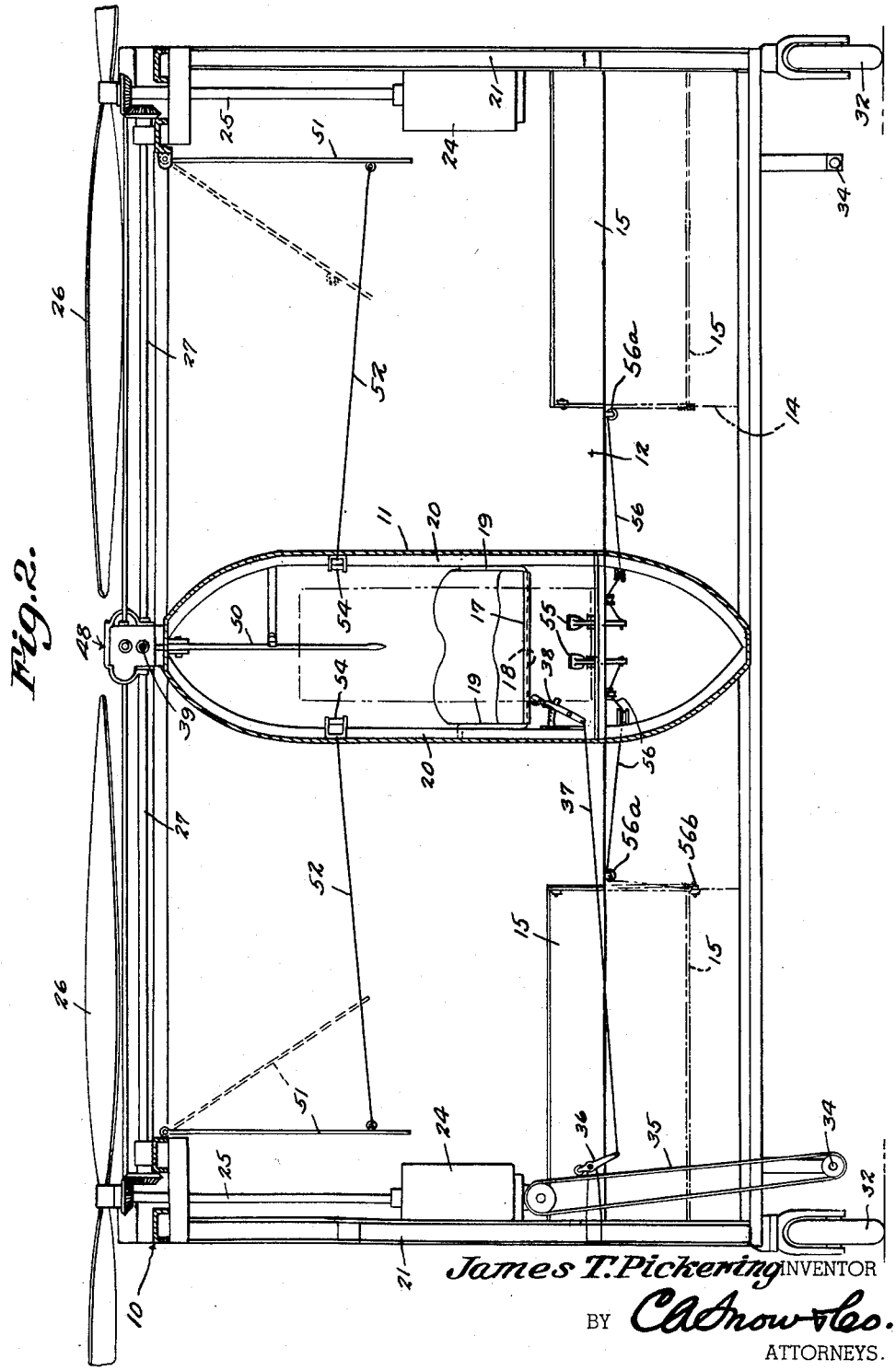
Fig. 2 is a front elevation, partly broken away and partly in section, of my helicopter.

The vertically extending intermediate frame bar 20 located within the fuselage pod provides the support for the upper end of the pivoted support 18. Vertically extending end frame bars 21 are also located outside the fuselage 11 adjacent to the opposite sides thereof to provide a substantially rigid support for the motors or prime movers 24 which are mounted on the opposite sides of the fuselage and between the wing panels 12 and 14 as better shown by Fig. 2 of the drawings.

Each of the motors 24 has a rotatable drive shaft 25 therein which extends upwardly to a position above the uppermost edge, or leading edge of the wings.

A propeller 26 is secured to the extreme upper end of each of the drive shafts 25 to provide the helicopter 10 with traction for vertical and horizontal flight.

A connecting shaft 27 is positioned between drive shafts 25, and geared thereto so that either motor 24 will drive both propellers. Under normal conditions both of the motors will be in operation but the connecting shaft will provide for the dual operation of both propellers in the event that one of the motors should lose power.

Vertically extending pivotal wheel positioning shafts 28 are disposed in pairs adjacent to the forward and rear ends of the fuselage to effect the outward swing and retraction of the wheels of the fuselage 11. Each of the vertically extending pivotal wheel positioning shafts 28 includes a pair of laterally extending brace arms 29 secured to the pivotal shaft 28 and rotatable in a bearing 30 which is mounted on the outside of the fuselage 11. A straight brace arm 31 is positioned at the extreme lower end of the rod 28. A landing wheel 32 is rotatably disposed at the outer end of each of the straight brace arms 31. The retraction of the wheels 32 is accomplished by rotating the shafts 28 about their axes. This causes a tilting of the aircraft by shifting the center of gravity of the helicopter 10.

Figure 3:
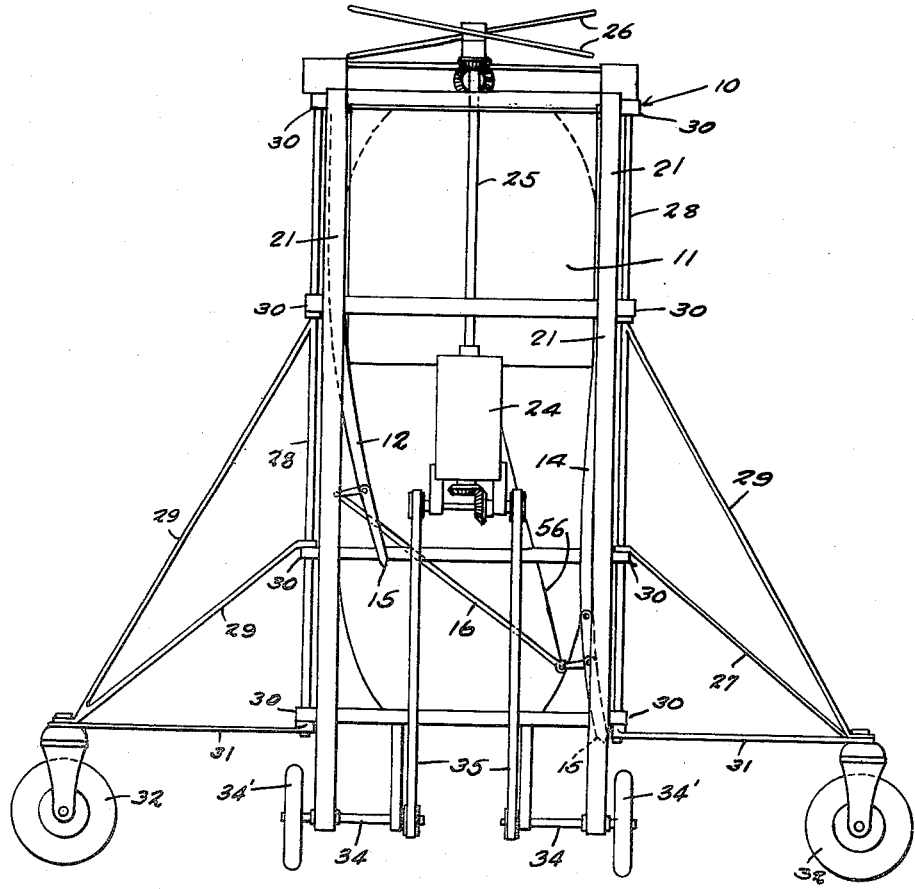
Fig. 3 is a side elevation of my helicopter.
Figure 6:
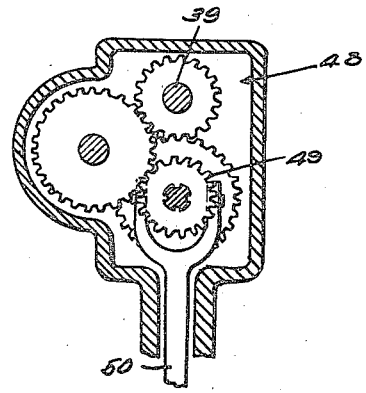
Fig. 6 is an enlarged detailed section on the line 6—6 of Fig. 5, of the reversing gear clutch for the landing wheels.

Taxiing wheels 34' are rotatably mounted on axles 34 which are positioned between the landing wheels 32, Fig. 3. Each axle 34 is rotated by a belt 35 driven by a motor 24.

The direction of movement of the helicopter plane when taxiing on the ground is controlled by the pilot. The belt 35 is tightened by a belt tensioning lever 36 supported below the prime mover 24 and controlled by a wire 37 which extends into the fuselage and this end of the wire or rod 37 is directly connected to a control lever 38 in the fuselage and under the control of the pilot, see Figure 2.

There is provided a shorter drive shaft 39 extending laterally of the connecting shaft 27 intermediate the length thereof and driven thereby. Each of the drive shafts 39 has a worm 40 on the outer end thereof which is engaged with a gear 41 on shaft 44 which is connected by gearing 42 to a pair of vertically extending pivotal wheel positioning shafts 28, so that the wheels 32 may be positively retracted or extended. Auxiliary wheels 34' are connected to axles 34 for ground taxiing.

The connecting shaft 44 between the wheel positioning shafts 28 has a gear 41 intermediate the length thereof for engaging with the worm 40 and bevel gear 46 in meshing with segmental gear 47 carried by the upper end of pivotal wheel positioning shaft 28.

There is a reversible gear clutch 48 between drive shaft 27 and each connecting wheel positioning shaft 44. Either one of the clutches may be put into operation by a pilot within the fuselage pod by use of a lever 50. When one pair of wheels is retracted that side of the helicopter will have its center of gravity shifted so that the craft as a whole will tilt resulting in the propellers operating at an angle to the horizontal position. By thus changing the center of gravity of the helicopter, a horizontal movement of the plane will be effected by the same propellers that control its vertical movement.

A movable clutch gear 49 is selectively controlled by the pilot with lever 50 which is directly connected to the gear 49 and extends within the fuselage near to the seat 17.

To further control the lateral movement in steering the helicopter plane 10 there is provided a vane 51 which is pivoted on the opposite sides of the fuselage and controlled by a cord 52 which is connected at one end to the vane and at the other end to a handle 54 within the fuselage. As the horizontal flight of the helicopter 10 is primarily a result of the position of the wheels, the handle 54, also under the control of the pilot, will more delicately control the direction of the flight path of the helicopter plane.

Pedals 35 also pivotally mounted within the fuselage are directly connected to the ailerons 15 by the conventional type of control line 56 so that the position and direction of the vertical and horizontal flight of the helicopter plane may be controlled by the ailerons 15, the vanes 51 and the extension of retraction of the wheels.

Fundamentally, the shifting of the wheels tilts the whole aircraft.

Use and operation

In preparation for flight the motors are started and warmed up. The landing wheels are in retracted position in front and back of the fuselage. The pilot uses lever 38 to tighten belts 35 and so start the wheels 34 in moving out of the hanger. The landing wheels 32 are then swung out, Fig. 2, before taking off.

Motors 24 are speeded up to the power needed for ascent. Equilibrium is controlled by use of vanes 51, controls 54 and ailerons 15 with controlling pedals 55. These pedals will also set the helicopter in the desired direction for horizontal flight.

A lever 50 is now used to retract one pair of wheels to give the necessary tilt for horizontal flight, the speed of which is determined by the amount of tilt, the limit of which is not sufficient to cause a dangerous spin. Ailerons 15 control the direction of flight and the vanes 51 are for leveling and slight banking.

For descent in landing, these operations are reversed.

While the specific details of one embodiment of this invention have been herein shown and described, the invention is not confined thereto as changes and alterations may be made without departing from the spirit and scope thereof as defined in the appended claims.

I claim:

1. A helicopter comprising a body, propellers mounted thereon and rotatable in a substantially horizontal plane for moving the helicopter in vertical and horizontal flight paths, landing wheels, means supporting said landing wheels, said means being adjustable for horizontal displacement of said landing wheels toward and away from the center of gravity of the helicopter, power means, first transmission means connecting said power means to said propellers, second transmission means connected to said supporting means, and manually actuatable means for selectively connecting said second transmission means to said first transmission means for adjusting selected sets of said landing wheels toward or away from the center of gravity of the helicopter, whereby to cause an angular displacement of the plane of rotation of said propellers.

2. A helicopter comprising a body, motive power means, a propeller mounted on a vertical shaft driven by the power means, landing gear mounted on the body so that it may be displaced in flight, said landing gear being actuated by a power take-off from the power means, and a manual control for the operator to selectively position the landing gear, at any point, in order to shift the center of gravity of the helicopter and thus change the amount of impulse for horizontal flight.

3. The device of claim 2, in which the power take-off for the landing gear is mechanically connected through a reversible clutch to the power means, said clutch being actuated by the said manual control.

4. The device of claim 2, in which the power take-off for the landing gear is mechanically connected through reversible gearing to the power means, said gearing being actuated by said manual control.

5. The device of claim 2, in which the power take-off for the landing gear is mechanically connected through a reversible clutch to the connecting shafting.

6. The device of claim 5, in which the landing gear is pivotally mounted to swing horizontally outward.

7. The device of claim 3, in which the helicopter also comprises a fuselage with manual control to adjust an upper and lower wing panel fixed on the front and back sides of the helicopter body and connected together by a tie rod.

8. The device of claim 7, in which ailerons are pivotally fixed to the lower sides of the wing panels and are attached to a pedal control.

9. The device of claim 8, in which vanes are pivotally mounted on opposite sides of the fuselage with a manual control for the vanes to affect horizontal steering.

References Cited in the file of this patent

UNITED STATES PATENTS

| | | |
|---|---|---|
| 1,350,201 | Yeso | Aug. 17, 1920 |
| 1,551,834 | Monsen | Sept. 1, 1925 |
| 1,655,114 | Tesla | Jan. 3, 1928 |
| 2,078,823 | Weaver | Apr. 27, 1937 |
| 2,382,460 | Young | Aug. 14, 1945 |
| 2,501,227 | Lewis | Mar. 21, 1950 |